United States Patent
Sawamura et al.

[19]

[11] Patent Number: 5,935,185
[45] Date of Patent: *Aug. 10, 1999

[54] CONTROL SYSTEM FOR INTERNAL COMBUSTION ENGINES FOR VEHICLES

[75] Inventors: Kazutomo Sawamura; Yoshiharu Saito; Shigetaka Kuroda, all of Wako, Japan

[73] Assignee: Honda Giken Kogyo Kabushiki Kaisha, Tokyo, Japan

[*] Notice: This patent is subject to a terminal disclaimer.

[21] Appl. No.: 08/848,520

[22] Filed: Apr. 28, 1997

[30] Foreign Application Priority Data

Apr. 30, 1996 [JP] Japan .................................. 8-132773

[51] Int. Cl.$^6$ .................................................. G06G 7/70
[52] U.S. Cl. .............................. 701/54; 701/51; 701/101; 477/109
[58] Field of Search ..................................... 701/101, 102, 701/51, 52, 53, 54, 55, 56, 58, 59, 60; 477/43, 44, 109, 115, 110, 121, 111, 154, 143, 102, 33; 123/564, 399, 563

[56] References Cited

U.S. PATENT DOCUMENTS

| | | |
|---|---|---|
| 5,086,668 | 2/1992 | Fujiwara et al. .......................... 477/161 |
| 5,101,786 | 4/1992 | Kamio et al. ............................. 123/399 |
| 5,109,826 | 5/1992 | Kato ......................................... 123/564 |
| 5,119,696 | 6/1992 | Yamaguchi ............................... 477/109 |
| 5,476,425 | 12/1995 | Shiraishi et al. ......................... 477/109 |
| 5,613,920 | 3/1997 | Uno et al. ................................. 477/109 |
| 5,658,217 | 8/1997 | Tsukada ................................... 477/109 |
| 5,709,629 | 1/1998 | Minowa et al. .......................... 477/120 |
| 5,759,134 | 6/1998 | Kuriyama ................................. 477/158 |
| 5,772,554 | 6/1998 | Tabata ...................................... 477/109 |

Primary Examiner—Jacques H. Louis-Jacques
Attorney, Agent, or Firm—Armstrong, Westerman, Hattori, McLeland & Naughton

[57] ABSTRACT

A control system for an internal combustion engine for a vehicle. Upon starting of gear shifting of an automatic transmission of the engine, which increases the change gear ratio of the automatic transmission, the output torque of the engine is increased to reduce a shock generated during the gear shifting. Retrogression of the gear shifting in the inertia phase of the automatic transmission is detected, and when the retrogression is detected, the output torque of the engine is additionally increased. A control amount for additionally increasing the output torque of the engine is calculated, and the timing of termination of the additional increasing of the output torque of the engine is detected.

11 Claims, 9 Drawing Sheets

CONTROL SYSTEM FOR INTERNAL COMBUSTION ENGINES FOR VEHICLES

BACKGROUND OF THE INVENTION

1. Field of the Invention

This invention relates to a control system for internal combustion engines for vehicles.

2. Description of the Related

Conventionally, a control system for internal combustion engines for vehicles is known, which reduces a shock generated during a so-called power-off downshift of an automatic transmission of an automotive vehicle, i.e., a downshift performed when an accelerator pedal of the vehicle is not depressed, by increasing the output torque of the engine to increase the rotational speed of the engine and hence shorten the inertia phase.

However, the conventional control system does not take into account variations in hydraulic pressure for operating the automatic transmission during the power-off downshift, and therefore provides the following inconvenience: FIG. 1A shows the relationship in timing between changes in the output torque of the engine, the hydraulic pressure, etc. during a power-off downshift, according to the conventional control system, in a case where the hydraulic pressure rises normally. On the other hand, FIG. 1B is a similar view to FIG. 1A, showing a case where the hydraulic pressure rises with delay.

According to FIG. 1A, hydraulic pressure Pon for operating a clutch of a lower-speed position (target speed position) rises without delay, and consequently the engaging force TP of the clutch becomes greater than the output torque TE of the engine at a time point a in FIG. 1A. As a result, the engine rotational speed NE increases to promote the downshift. On the other hand, according to FIG. 1B, the hydraulic pressure Pon rises with delay, and consequently the clutch engaging force TP is smaller than the engine output torque TE at a time point b in FIG. 1B. As a result, the engine rotational speed NE largely drops once at a time point c in FIG. 1B, so that the downshift temporarily retrogresses, resulting in a prolonged downshift duration. This prolonged downshift duration causes even a larger shock during the downshift, even if the engine output torque is increased by increasing the throttle valve opening TH as shown in the figure.

A possible reason for the rising delay in the hydraulic pressure for operating the lower-speed position (target speed position) clutch is that if the hydraulic pressure rises under a condition that transmission oil is completely drained from an oil passage of the automatic transmission, it takes some time period to again fill the oil passage with the transmission oil, which can delay the rise of the hydraulic pressure. Further, also the temperature or characteristics of the transmission oil can cause variations in the rise of the hydraulic pressure.

SUMMARY OF THE INVENTION

It is the object of the invention to provide a control system for internal combustion engines for vehicles, which is capable of promoting the increase in the engine rotational speed to shorten the gear-shifting duration, even if the hydraulic pressure for operating a clutch of a lower-speed position (target speed position) rises with delay, to thereby reduce a shock generated during gear shifting.

To attain the above object, the present invention provides a control system for an internal combustion vehicle for a vehicle, the engine having an automatic transmission, comprising:

output torque-increasing means operable upon starting of gear shifting which increases a change gear ratio of the automatic transmission, for increasing output torque of the engine to reduce a shock generated during the gear shifting;

gear shifting retrogression-detecting means for detecting retrogression of the gear shifting in an inertia phase of the automatic transmission;

output torque-additionally increasing means operable when the retrogression of the gear shifting is detected, for additionally increasing the output torque of the engine;

control amount-calculating means for calculating a control amount for additionally increasing the output torque of the engine; and termination timing-detecting means for detecting timing of termination of the additional increasing of the output torque of the engine.

Preferably, the gear shifting retrogression-detecting means detects the retrogression of the gear shifting, based on a direction of change in a rotational speed ratio between an input shaft and an output shaft of the automatic transmission.

More preferably, the gear shifting retrogression-detecting means determines that the retrogression of the gear shifting has occurred when the rotational speed ratio between the input shaft and the output shaft has a direction of change thereof inverted toward a higher speed ratio side.

Preferably, the control amount-calculating means calculates the control amount for additionally increasing the output torque of the engine, based on a torque increment by which the output torque of the engine is increased by the output torque-increasing means and a rotational speed ratio between an input shaft and an output shaft of the automatic transmission.

More preferably, the control amount-calculating means calculates the control amount for additionally increasing the output torque of the engine, by multiplying the torque increment by the output torque-increasing means by a coefficient based on a ratio or a difference between the rotational speed ratio between the input shaft and the output shaft and a predetermined threshold value.

Alternatively, the control amount-calculating means calculates the control amount for additionally increasing the output torque of the engine, by multiplying the torque increment by the output torque-increasing means by a coefficient based on the rotational speed ratio between the input shaft and the output shaft.

Advantageously, the termination timing-calculating means sets the timing of termination of the additional increasing of the output torque of the engine to a time point at which a rotational speed ratio between an input shaft and an output shaft of the automatic transmission has a direction of change thereof inverted toward a lower speed ratio side.

Alternatively, the termination timing-calculating means sets the timing of termination of the additional increasing of the output torque of the engine to a time point at which a rotational speed ratio between an input shaft and an output shaft of the automatic transmission crosses a predetermined threshold value.

Preferably, the predetermined threshold value is set based on traveling speed of the vehicle and a pattern of the gear shifting.

The above and other objects, features and advantages of the invention will become more apparent from the following detailed description taken in conjunction with the accompanying drawings.

DETAILED DESCRIPTION

The invention will now be described in detail with reference to the drawings showing an embodiment thereof.

Figure 1A:
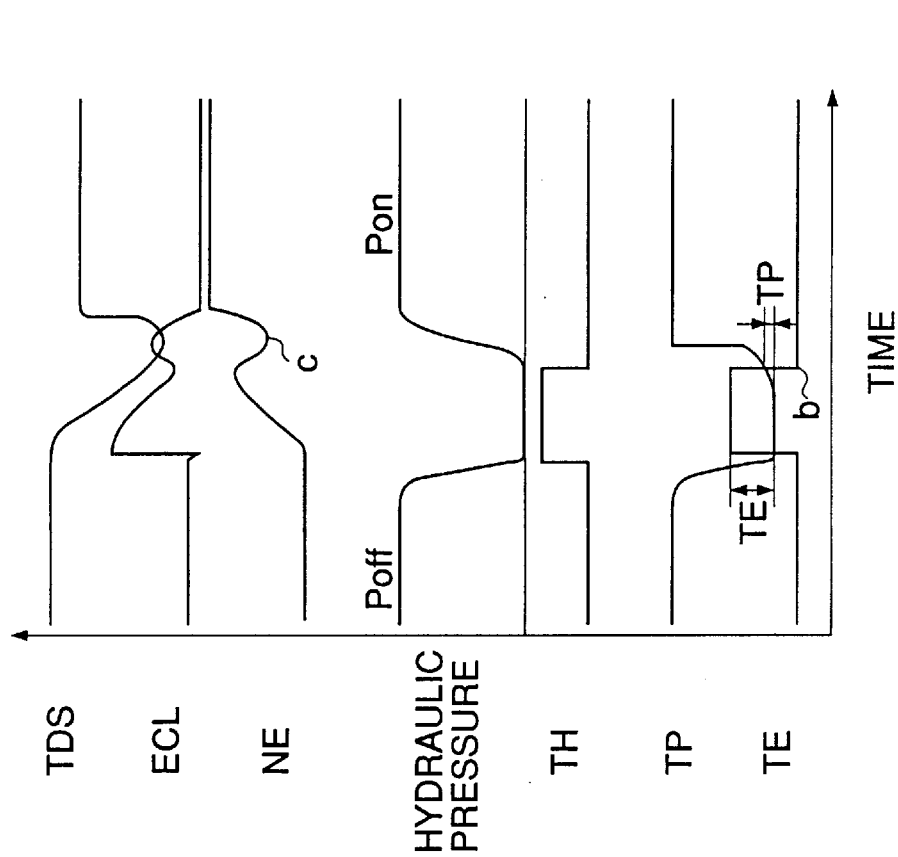
FIG. 1A is a timing chart showing transient characteristics exhibited by a conventional internal combustion engine and a transmission thereof, according to the prior art, in a case where hydraulic pressure for operating a lower speed position (target speed position) clutch rises normally.
Figure 1B:
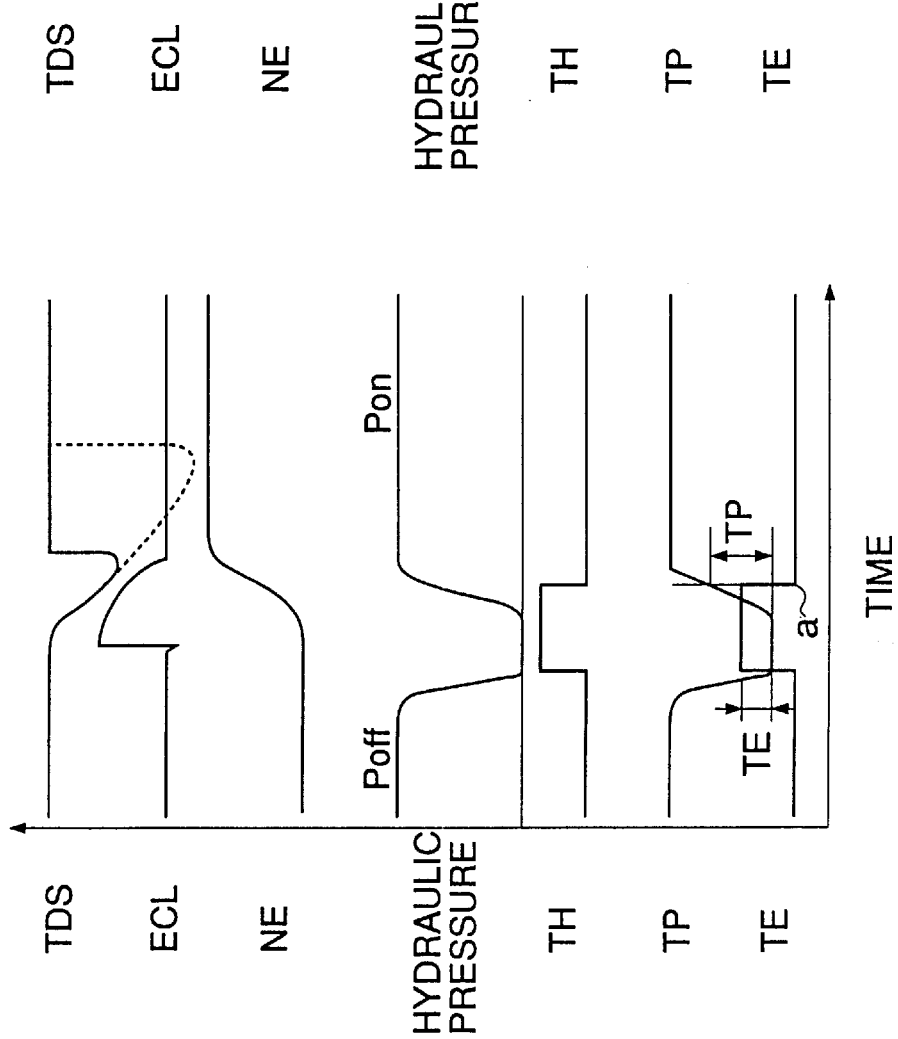
FIG. 1B is a timing chart similar to FIG. 1A, showing a case where the hydraulic pressure rises with delay.
Figure 2:
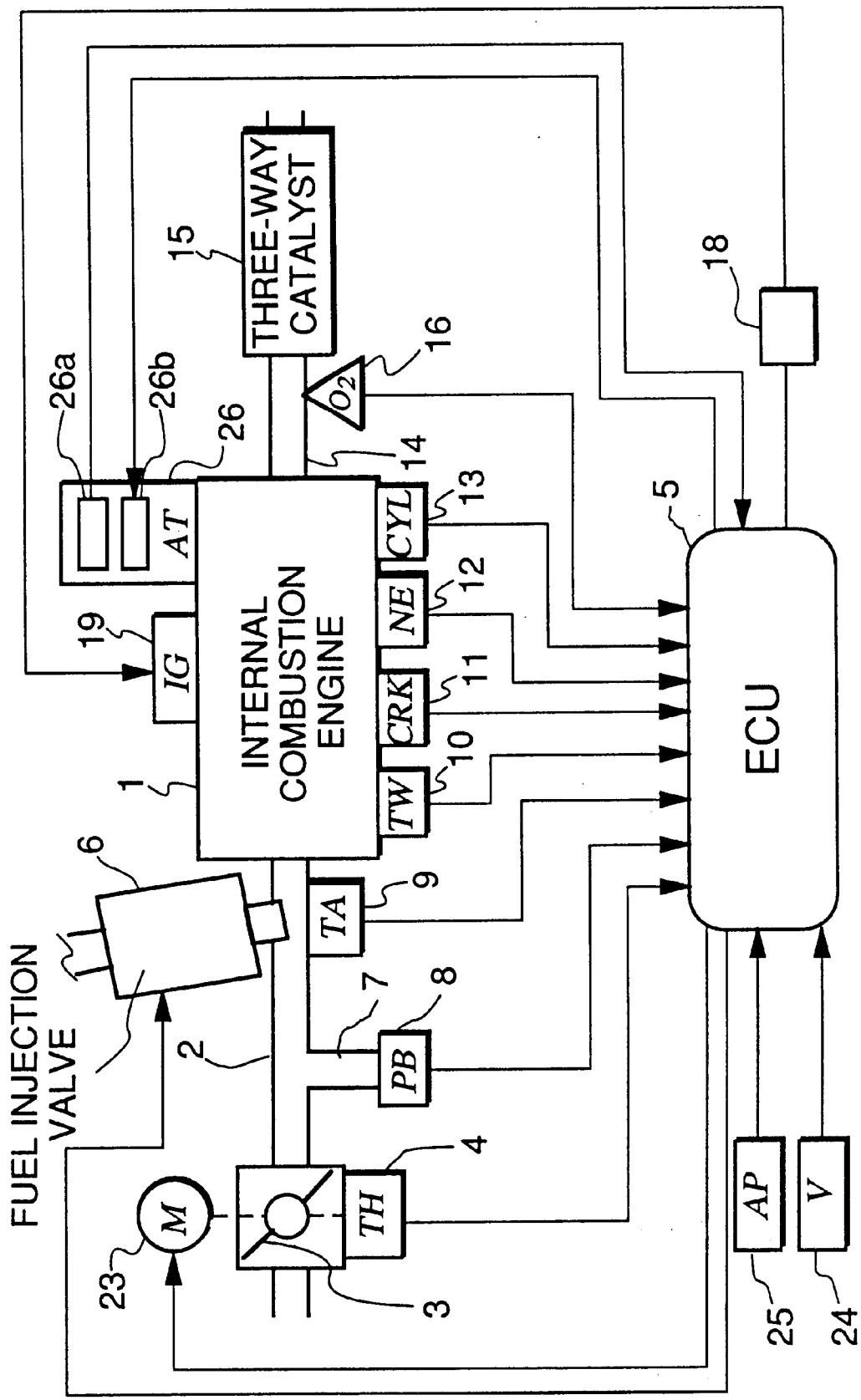
FIG. 2 is a block diagram schematically showing the whole arrangement of an internal combustion engine and a control system therefor, according to an embodiment of the invention.

Referring first to FIG. 2, there is illustrated the whole arrangement of an internal combustion engine (hereinafter simply referred to as "the engine") and a control system therefor, according to an embodiment of the invention.

In the figure, reference numeral 1 designates an internal combustion engine, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and an accelerator pedal position (AP) sensor 25 for detecting the position AP of an accelerator pedal of the vehicle, not shown. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

A spark plug 19 is arranged in each cylinder of the engine 1 and electrically connected to the ECU 5 through a distributor 18. Further connected to the ECU 5 is an automatic transmission 26 which is a conventional type and is comprised of a lock-up clutch, a gear mechanism having an input shaft (main shaft), and a output shaft, none of which are shown, a hydraulic pressure control circuit 26b for controlling the operations of the lock-up clutch and the gear mechanism, and a gear position sensor 26a for detecting the shift position of the gear mechanism. The hydraulic pressure control circuit 26b and the gear position sensor 26a are electrically connected to the ECU 5. The hydraulic pressure control circuit 26b drives gear-shifting linear solenoid valves, not shown, of the gear mechanism for controlling hydraulic pressure for operating clutches of the transmission.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) of a vehicle in which the engine 1 is installed and supplying a signal indicative of the sensed vehicle speed V to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which supplies driving signals to the fuel injection valves 6, the distributor 18, the throttle actuator 23, etc., and also supplies control signals to the hydraulic control circuit 26.

The CPU of the ECU 5 operates in response to signals from various engine operating parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection time period Tout for each of the fuel injection valves 6, in synchronism with generation of TDC signal pulses, by the use of the following equation (1):

$$Tout = Ti \times KO2 \times K1 + K2 \qquad \ldots (1)$$

where Ti represents a basic value of the fuel injection period Tout, which is determined according to the engine rotational speed NE and the intake pipe absolute pressure PBA, by the use of a Ti map, not shown, and stored in the memory means.

KO2 represents an air-fuel ratio correction coefficient calculated based on the output signal from the O2 sensor 16, which is calculated to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions.

K1 and K2 represent other correction coefficients and correction variables, respectively, which are set according to engine operating parameters to such values as optimize engine operating characteristics, such as fuel consumption and engine accelerability.

Further, the CPU of the ECU 5 calculates the ignition timing θIG of the engine, based on the determined engine operating conditions. Driving signals corresponding to the TOUT and θIG values calculated as above are delivered via the output circuit to the fuel injection valves 6 and the spark plugs 19, respectively, to drive them.

Further, the CPU controls the engaged state of the lock-up clutch, the shift position of the gear mechanism, the valve opening TH of the throttle valve 3 in response to outputs signals from various engine operating parameter sensors.

Figure 3:
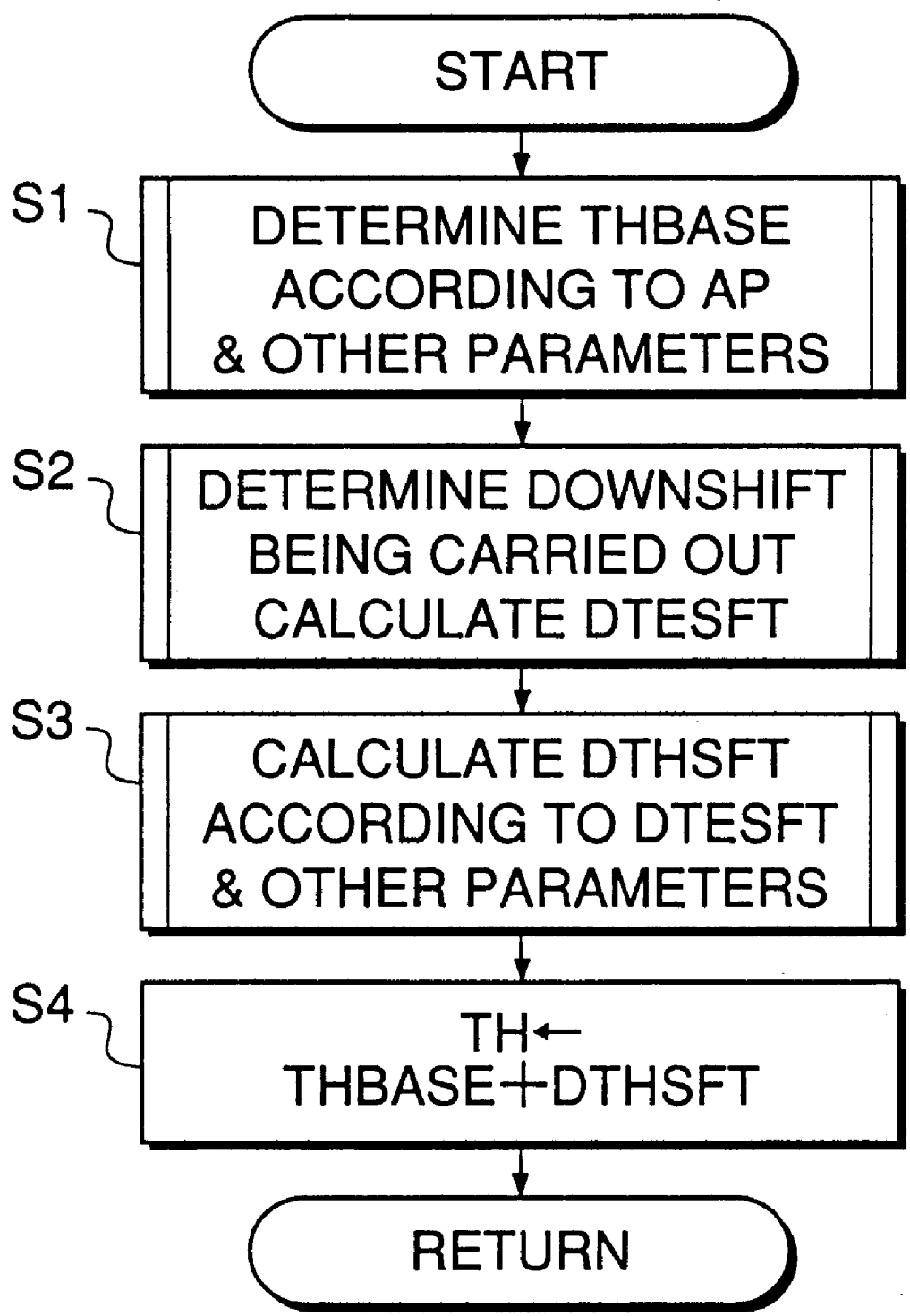
FIG. 3 is a flowchart showing main routine for controlling the output torque of the engine, which is executed by an ECU appearing in FIG. 2.
Figure 4:
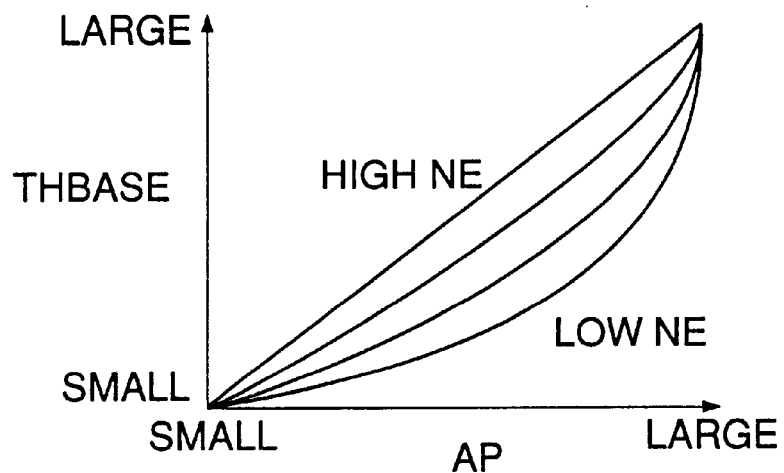
FIG. 4 is a graph showing the relationship between a basic value THBASE of the throttle valve opening TH, an accelerator pedal position AP, and engine rotational speed NE.

FIG. 3 shows a main routine for carrying out engine output torque control processing, which is executed by the ECU 5. This processing is repeatedly executed at predetermined time intervals set by a timer. First, at a step S1, a basic value THBASE of the throttle valve opening TH is determined according to the accelerator pedal position AP and the engine rotational speed NE. FIG. 4 is a graph showing the relationship between the basic throttle valve opening THBASE, the accelerator pedal position AP, and the engine rotational speed NE.

Then, it is determined at a step S2 whether or not a downshift of the automatic transmission 26 is being carried out in response to outputs from the accelerator pedal position sensor 25 and the gear position sensor 26a. Then, a torque correction amount DTESFT for reducing a shock caused by a downshift is calculated depending on the result of the determination. When a downshift is being carried out, the torque correction amount DTESFT is calculated in response to gear-shifting conditions which change every moment according to the speed position SFT, the output torque of the engine (engine rotational speed NE and intake pipe absolute pressure PBA), the change gear ratio of the transmission, the vehicle speed V, etc. Processing for calculating the torque correction amount DTESFT will be described hereinafter.

When a downshifting command is issued and delivered to the hydraulic pressure control circuit 26 from the CPU of the ECU 5, based on the outputs from the accelerator pedal position sensor 25 and the gear position sensor 26a, gear-shifting linear solenoid valves of the gear mechanism are driven based on gear-shifting conditions or patterns (third-speed position→second-speed position, fourth-speed position→second-speed position, etc.). However, a delay time exists between the time the linear solenoid valve for the clutch of the target speed position starts to be driven and the time the operating hydraulic pressure actually rises, and therefore execution of the torque correction amount DTESFT-calculation is delayed by a predetermined delay time period. The torque correction amount DTESFT is kept at 0 until the start of the calculation. When the predetermined delay time period has elapsed and a target speed position (lower-speed position) clutch starts to be engaged, the torque correction amount DTESFT-calculation is executed. The torque correction amount DTESFT calculated in this processing is basically set to a positive value at the start of a downshift which increases the change gear ratio of the automatic transmission 26, so as to increase the engine output torque. When the torque correction amount DTESFT is equal to 0, the throttle valve opening TH is not substantially changed. When the torque correction amount DTESFT is greater than 0, an increase in the engine output torque is demanded.

Figure 5:
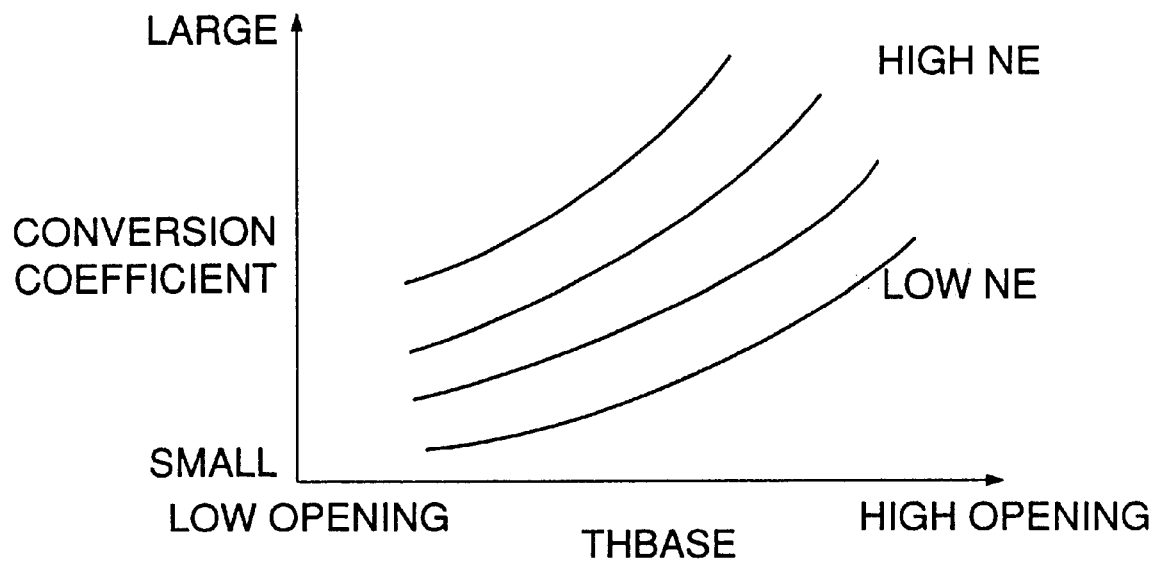
FIG. 5 is a graph showing the relationship between a conversion coefficient, the engine rotational speed NE, and the basic throttle valve opening THBASE.

At a step S3, a throttle valve opening correction amount DTHSFT is calculated based on the torque correction amount DTESFT calculated at the step S2. More specifically, the throttle valve opening correction amount DTHSFT is obtained by multiplying the torque correction amount DTESFT by a conversion coefficient which is retrieved from a map according to the engine rotational speed NE and the basic throttle valve opening THBASE by the torque correction amount DTESFT. FIG. 5 shows the map for determining the conversion coefficient. The conversion coefficient is set to a larger value as the engine rotational speed NE becomes higher and/or the basic throttle valve opening THBASE becomes larger.

Then, throttle valve control is carried out at a step S4. More specifically, the throttle valve opening TH is set to a value obtained by adding the throttle valve opening correction amount DTHSFT to the basic throttle valve opening THBASE, followed by terminating the present routine. Thus, the throttle valve 3 is driven to the set throttle valve opening TH through the throttle actuator 23.

Figure 6:
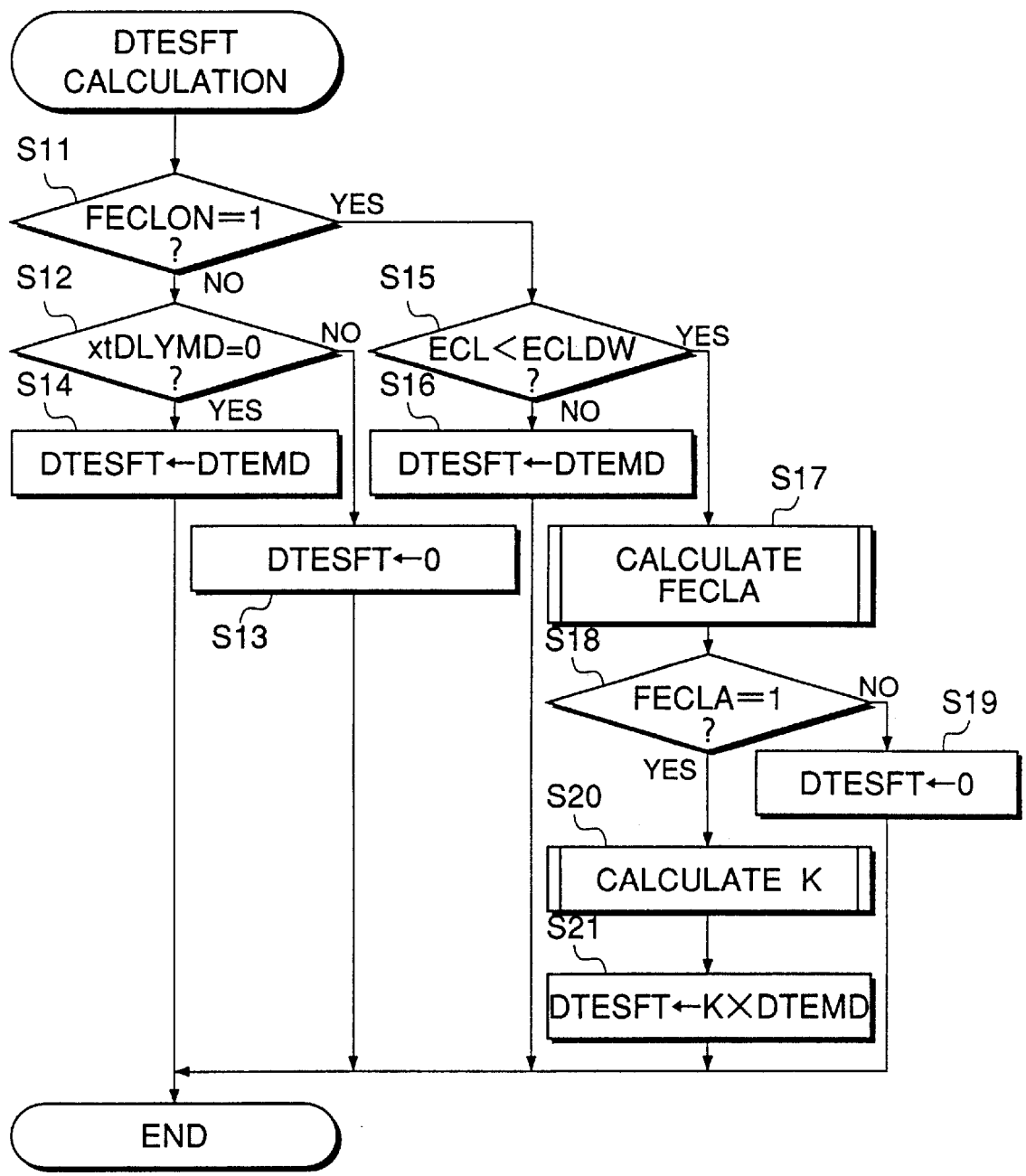
FIG. 6 is a flowchart showing a subroutine for calculating a torque correction amount DTESFT employed during a downshift, which is executed at a step S2 in FIG. 3.

FIG. 6 shows a subroutine for carrying out the torque correction amount DTESFT-calculating processing during a downshift, which is executed at the step S2 in FIG. 3. FIG. 7A shows the relationship in timing between an input/output rotational speed ratio ECL, referred to hereinbelow, the engine rotational speed NE, the torque correction amount DTESFT, etc., which are assumed during a downshift.

First, at a step S11 in FIG. 6, a flag FECLON which, when set to "1", indicates that the transmission is in an inertia phase, is equal to "1". Processing for setting the flag FECLON will be described hereinafter. If the flag FECLON is not set to "1", it is determined at a step S12 whether or not a predetermined delay time period xtDLYMD has elapsed after the issuance of the downshifting command. The delay time period xtDLYMD is set to a standard time period from the time the linear solenoid starts to be driven by the downshifting command to the time the hydraulic pressure of the clutch rises, which is empirically determined.

So long as the delay time period xtDLYMD has not elapsed, the torque correction amount DTESFT is set to 0 at a step S13 (see a in FIG. 7D), followed by terminating the present routine. On the other hand, if the delay time period xtDLYMD has elapsed, the torque correction amount DTESFT is set to a torque increment DTEMD at a step S14 (see b in FIG. 7D), followed by terminating the present routine. FIG. 8 shows a table for determining the torque increment DTEMD according to the vehicle speed V. A plurality of kinds of this table are provided according to downshifting patterns (5th speed position→4th speed position, 4th speed position→3rd speed position, etc.)

On the other hand, if the flag FECLON is set to "1", which means that the transmission is in the inertia phase, it is determined at a step S15 whether or not the input/output rotational speed ratio ECL becomes smaller than a predetermined threshold value ECLDW (see g in FIG. 7B). The input/output rotational speed ratio ECL is a ratio of the rotational speed of the output shaft (counter shaft) of the automatic transmission 26 to the rotational speed of the input shaft (main shaft) of the same, which is calculated by the use of the following equation (2):

$$ECL = Ncs \times i \times 1/Nms \qquad \ldots (2)$$

where Ncs represents the rotational speed of the counter shaft, i the change gear ratio of the transmission, and Nms the rotational speed of the main shaft.

Until the input/output rotational speed ratio ECL becomes smaller than the threshold value ECLDW, the torque correction amount DTESFT is set to the torque increment DTEMD at a step S16 (see c in FIG. 7), followed by terminating the present routine.

On the other hand, if the input/output rotational speed ratio ECL becomes less than the threshold value ECLDW, processing for setting a flag FECLA which, when set to "1", indicates that the engine output torque should be increased again, is carried out at a step S17. The FECLA-setting processing will be described hereinafter. Then, it is determined at a step S18 whether or not the flag FECLA is set to "1". If the flag FECLA is not set to "1", which means that the engine output torque should not be increased again, the torque correction amount DTESFT is set to "0" at a step S19 (see d in FIG. 7), followed by terminating the present routine.

On the other hand, if the flag FECLA is set to "1", which means that the engine output torque should be increased again, a coefficient K by which the torque increment DTEMD is multiplied is calculated at a step S20. The coefficient K is calculated based on a ratio between an input/output rotational speed ratio ECLA assumed at an inverting time point A in FIG. 7 and a threshold value ECLDW. That is, the coefficient K is set to a greater value ($0 < K \leq 1.0$) as the ratio ECLA/ECLDW between the input/output rotational speed ratio ECLA and the threshold value ECLDW is smaller. Instead of the ratio, ECLA/ECLDW, the difference ECLDW-ECLA may be used for setting the coefficient K. Then, the torque increment DTEMD is multiplied by the thus determined coefficient K at a step S21, by the use of the following equation (3), followed by terminating the present routine:

$$DTESFT = DTEMD \times K \qquad \ldots (3)$$

Figure 9:
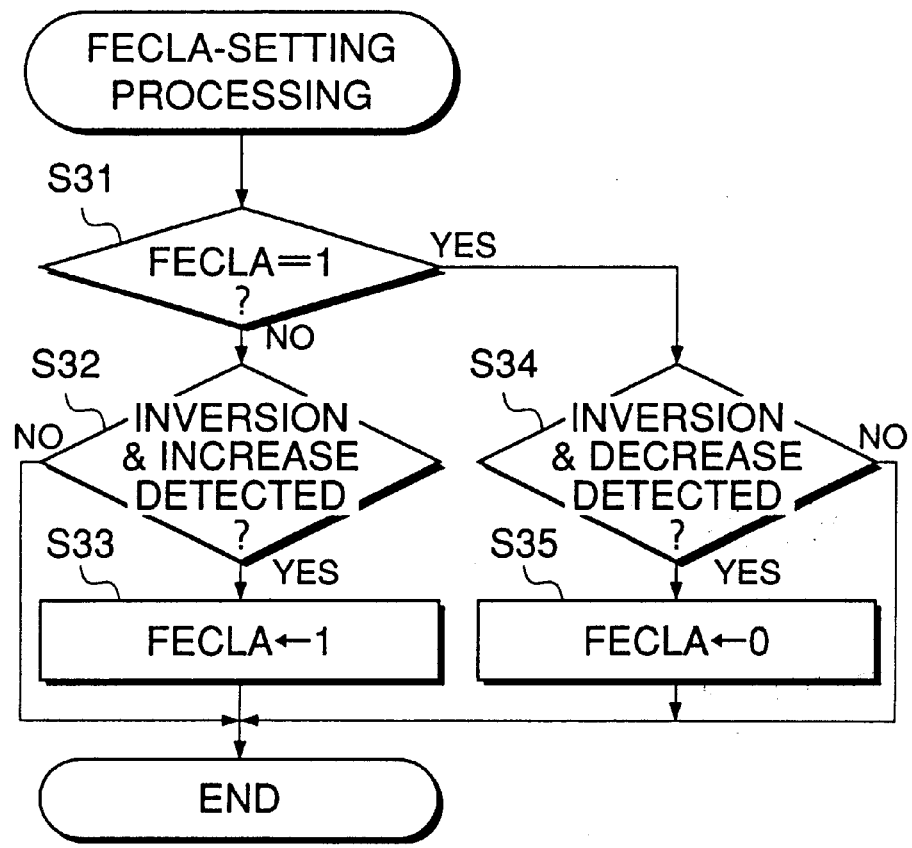
FIG. 9 is a flowchart showing a subroutine for carrying out FECLA-setting processing, which is executed at a step S17 in FIG. 6.

FIG. 9 shows a subroutine for carrying out the FECLA-setting processing, which is executed at the step S17 in FIG. 6. First, it is determined at a step S31 whether or not the flag FECLA is set to "1". If the flag FECLA is not set to "1", it is determined at a step S32 whether or not the direction of change of the input/output rotational speed ratio ECL has been inverted toward a higher speed ratio side (time point A in FIG. 7). If the inversion of the change direction of the input/output rotational speed ratio ECL has been detected, i.e. the operating hydraulic pressure of the lower-speed clutch rises with delay, the flag FECLA is set to "1" at a step S33, followed by terminating the present routine. On the other hand, if the inversion of the change direction of the input/output rotational speed ratio ECL has not been detected at the step S32, the program is terminated without executing the step S33.

Figure 7:
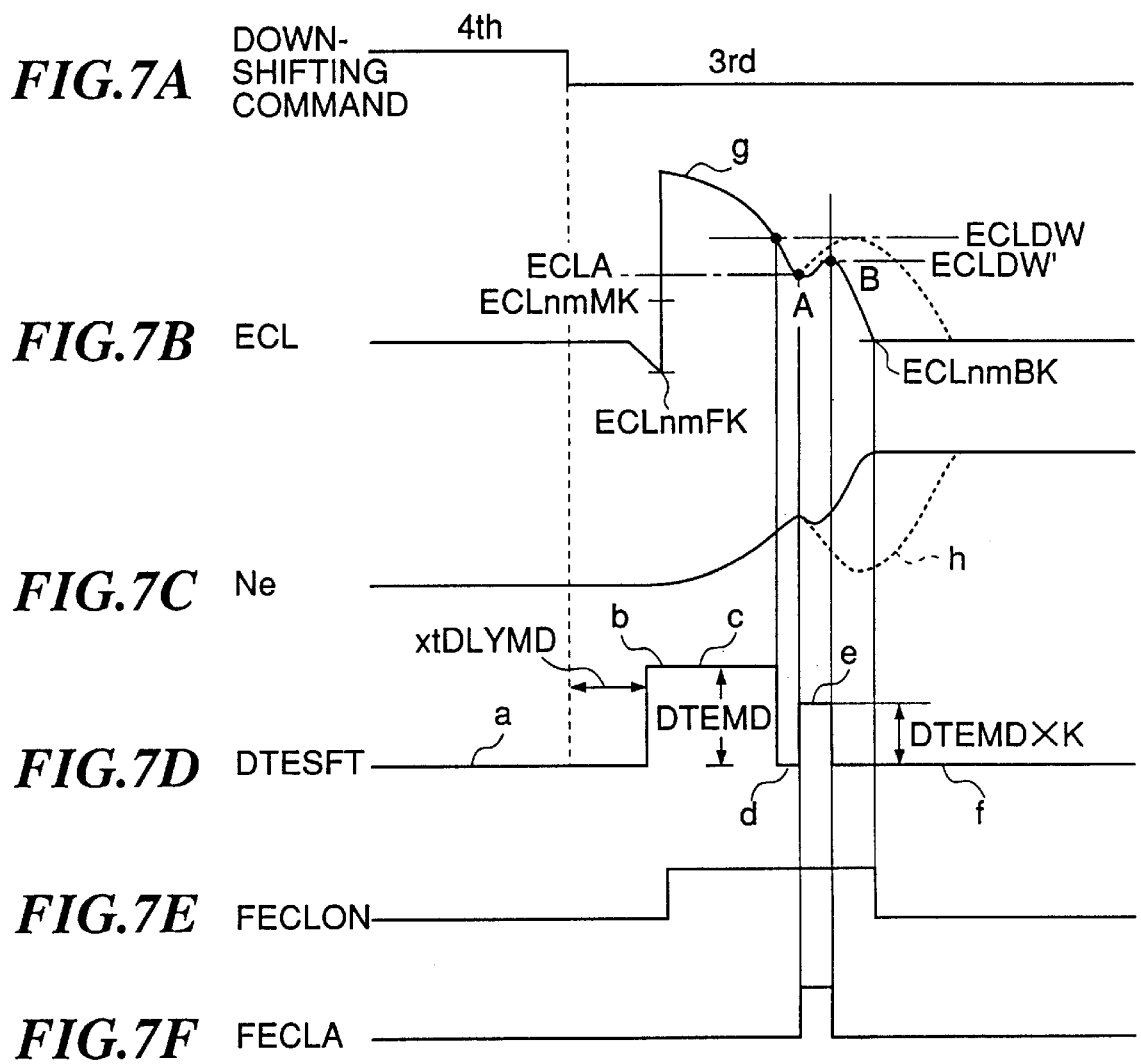
FIGS. 7A–7F are timing charts showing transient characteristics exhibited by the engine and the control system according to the embodiment during a downshift.
Figure 8:
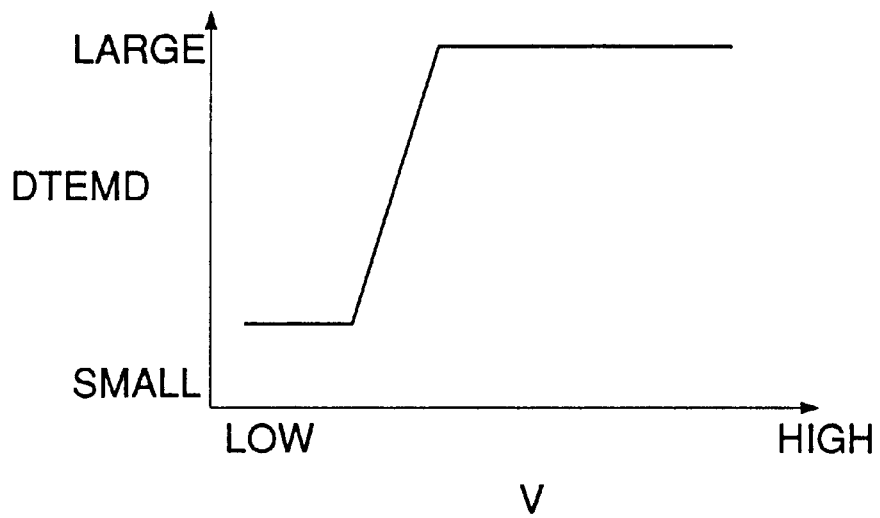
FIG. 8 shows a table for determining a torque increment DTEMD according to the vehicle speed V.

On the other hand, if the flag FECLA is set to "1", it is determined at a step S34 whether or not the change direction of the input/output rotational speed ratio ECL has been inverted to a lower speed ratio side by the additional increase (DTEMD×K) of the engine output torque (time point B in FIG. 7). If the inversion of the change direction of the input/output rotational speed ratio ECL has been detected, the flag FECLA is reset to "0" at a step S35, and the additional increase of the output torque is terminated. On the other hand, if the inversion of the change direction of the input/output rotational speed ratio ECL has not been detected at the step S34, the program is terminated without executing the step S35.

Figure 10:
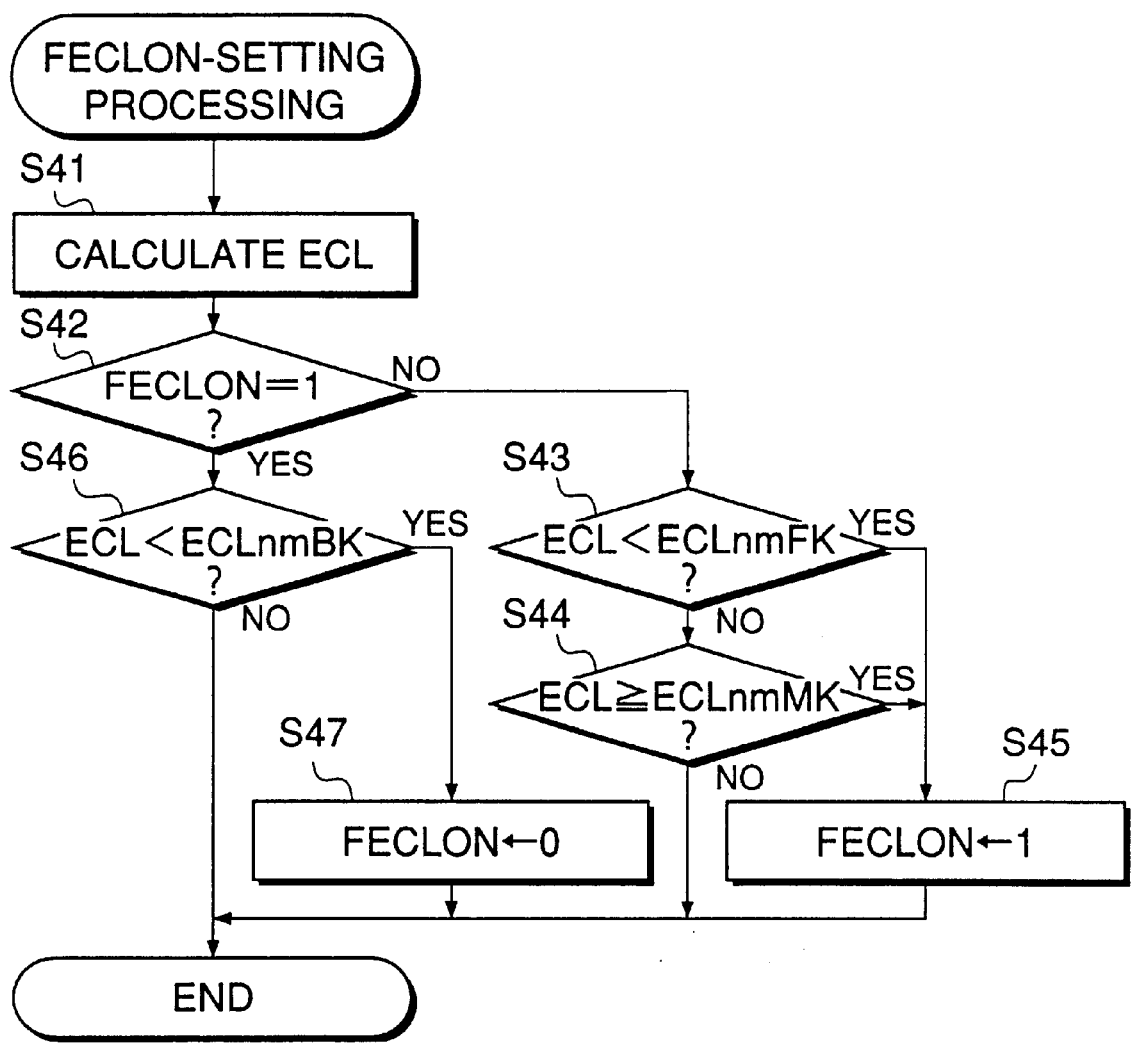
FIG. 10 is a flowchart showing a subroutine for carrying out FECLON-setting processing, which is executed at a step S11 in FIG. 6.

FIG. 10 shows a subroutine for carrying out the FECLON-setting processing which is executed at the step S11 in FIG. 6. First, at a step S41, the input/output rotational speed ratio ECL is calculated. Then, it is determined at a step S42 whether or not the flag FECLON is set to "1". If the flag FECLON is not set to "1", it is determined at steps S43 and S44 whether or not the input/output rotational speed ratio ECL falls within a predetermined range between threshold values ECLnmFK and ECLnmMK (see FIG. 7). If the value ECL does not fall within the predetermined range, i.e. if a clutch of the higher-speed position (original speed position) clutch starts to slip and hence the input/output rotational speed ratio ECL becomes higher, it is determined that the transmission is in the inertia stage, and therefore the flag FECLON is set to "1" at a step S45 (see FIG. 7E), followed by terminating the present routine. On the other hand, if the value ECL falls within the predetermined range, the program is terminated without executing the step S45.

On the other hand, if the flag FECLON is set to "1" at the step S42, it is determined at a step S46 whether or not the input/output rotational speed ratio ECL is smaller than a threshold value ECLnmBK. If the input/output rotational speed ratio ECL is not smaller than the threshold value ECLnmBK, the program is immediately terminated. On the other hand, if the input/output rotational speed ratio ECL is smaller than the threshold value ECLnmBK, it is determined that the transmission has left the inertia phase. Then, the flag FECLON is reset to "0" at a step S47, followed by terminating the present routine.

As described hereinabove, according to the present embodiment, in the case where the hydraulic pressure of the lower-speed position (target speed position) clutch rises with delay and hence the engine rotational speed NE decreases (as indicated by the broken line h in FIG. 7C), even if the engine torque is increased upon starting of a downshift, the engine output torque is increased again to increase the engine rotational speed. As a result, it can be prevented that the optimum balance between the engine output torque and the clutch engaging force is lost to impede an increase in the engine rotational speed NE, resulting in a prolonged downshift duration and hence a large gear-shifting shock.

Figure 11:
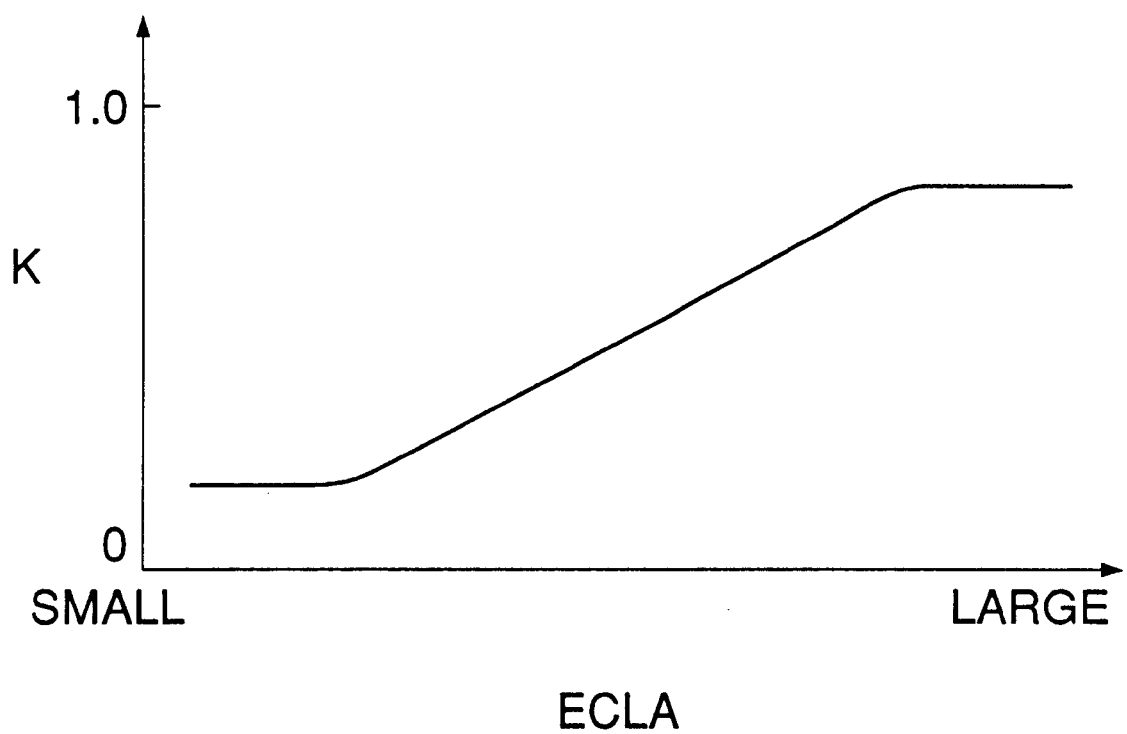
FIG. 11 shows a table for determining a coefficient K according to an input/output rotational speed ECLA assumed when the direction of change of the input/output rotational speed ECL is inverted toward a higher speed ratio side at a time point A in FIG. 7.

The coefficient K may be set to a value corresponding to the input/output rotational speed ratio ECLA assumed at the inverting time point A in FIG. 7. FIG. 11 shows a table for determining the coefficient K according to the input/output rotational speed ratio ECLA, in which the coefficient K is set to a larger value as the value ECLA becomes larger. Thus, the coefficient K can be immediately determined based on the table.

Further, according to the present embodiment, a time point at which the additional increase of the engine output torque is terminated is set to a time point at which the direction of change of the input/output rotational speed ratio ECL is inverted to a lower speed ratio side (inverting time point B in FIG. 7), but this is not limitative. Alternatively, the terminating time point may be set to a time point at which the value ECL crosses a threshold value ECLDW' which is set based on the vehicle speed V and the downshifting pattern.

Still further, in the above described embodiment the engine output torque is controlled by regulating the throttle valve opening, but this is not limitative. Alternatively, the engine output torque may be controlled by regulating the retard amount of the ignition timing, which can achieve substantially the same effects.

What is claimed is:

1. A control system for an internal combustion engine for a vehicle, said vehicle having an automatic transmission, comprising:

output torque-increasing means operable upon starting of gear shifting which increases a change gear ratio of said automatic transmission, for increasing output torque of said engine to reduce a shock generated during said gear shifting;

gear shifting retrogression-detecting means for detecting retrogression of said gear shifting in an inertia phase of said automatic transmission;

output torque-additionally increasing means operable when said retrogression of said gear shifting is detected, for additionally increasing said output torque of said engine;

control amount-calculating means for calculating a control amount for additionally increasing said output torque of said engine; and termination timing-detecting means for detecting timing of termination of said additional increasing of said output torque of said engine.

2. A control system as claimed in claim 1, wherein said automatic transmission has an input shaft and an output shaft, said gear shifting retrogression-detecting means detecting said retrogression of said gear shifting, based on a direction of change in a rotational speed ratio between said input shaft and said output shaft.

3. A control system as claimed in claim 2, wherein said gear shifting retrogression-detecting means determines that said retrogression of said gear shifting has occurred when said rotational speed ratio between said input shaft and said output shaft has a direction of change thereof inverted toward a higher speed ratio side.

4. A control system as claimed in claim 1, wherein said automatic transmission has an input shaft and an output shaft, said control amount-calculating means calculating said control amount for additionally increasing said output torque of said engine, based on a torque increment by which said output torque of said engine is increased by said output torque-increasing means and a rotational speed ratio between said input shaft and said output shaft.

5. A control system as claimed in claim 4, wherein said control amount-calculating means calculates said control amount for additionally increasing said output torque of said engine, by multiplying said torque increment by said output torque-increasing means by a coefficient based on a ratio or a difference between said rotational speed ratio between said input shaft and said output shaft and a predetermined threshold value.

6. A control system as claimed in claim 4, wherein said control amount-calculating means calculates said control amount for additionally increasing said output torque of said engine, by multiplying said torque increment by said output torque-increasing means by a coefficient based on said rotational speed ratio between said input shaft and said output shaft.

7. A control system as claimed in claim 1, wherein said automatic transmission has an input shaft and an output shaft, said termination timing-calculating means setting said timing of termination of said additional increasing of said output torque of said engine to a time point at which a rotational speed ratio between said input shaft and said output shaft has a direction of change thereof inverted toward a lower speed ratio side.

8. A control system as claimed in claim 1, wherein said automatic transmission has an input shaft and an output shaft, said termination timing-calculating means setting said timing of termination of said additional increasing of said output torque of said engine to a time point at which a rotational speed ratio between said input shaft and said output shaft crosses a predetermined threshold value.

9. A control system as claimed in claim 8, wherein said predetermined threshold value is set based on traveling speed of said vehicle and a pattern of said gear shifting.

10. A control system for an internal combustion engine for a vehicle, said vehicle having an automatic transmission, comprising:

output torque-increasing means operable upon starting of gear shifting which increases a change gear ratio of said automatic transmission, for increasing output torque of said engine to reduce a shock generated during said gear shifting;

gear shifting retrogression-detecting means for detecting retrogression of said gear shifting in an inertia phase of said automatic transmission;

output torque-additionally increasing means operable when said retrogression of said gear shifting is detected, for additionally increasing said output torque of said engine;

control amount-calculating means for calculating a control amount for additionally increasing said output torque of said engine; and termination timing-detecting means for detecting timing of termination of said additional increasing of said output torque of said engine, wherein said control amount-calculating means calculates said control amount for additionally increasing said output torque of said engine, by multiplying said torque increment by said output torque-increasing means by a coefficient based on a ratio or a difference between said rotational speed ratio between said input shaft and said output shaft and a predetermined threshold value.

11. A control system for an internal combustion engine for a vehicle, said vehicle having an automatic transmission, comprising:

output torque-increasing means operable upon starting of gear shifting which increases a change gear ratio of said automatic transmission, for increasing output torque of said engine to reduce a shock generated during said gear shifting;

gear shifting retrogression-detecting means for detecting retrogression of said gear shifting in an inertia phase of said automatic transmission;

output torque-additionally increasing means operable when said retrogression of said gear shifting is detected, for additionally increasing said output torque of said engine;

control amount-calculating means for calculating a control amount for additionally increasing said output torque of said engine; and termination timing-detecting means for detecting timing of termination of said additional increasing of said output torque of said engine, wherein said control amount-calculating means calculates said control amount for additionally increasing said output torque of said engine, by multiplying said torque increment by said output torque-increasing means by a coefficient based on said rotational speed ratio between said input shaft and said output shaft.

* * * * *